United States Patent [19]
Sul et al.

[11] Patent Number: 5,886,498
[45] Date of Patent: Mar. 23, 1999

[54] SENSORLESS FIELD ORIENTATION CONTROL METHOD OF AN INDUCTION MACHINE BY HIGH FREQUENCY SIGNAL INJECTION

[76] Inventors: Seung-ki Sul, 1545-3, Sillim-Dong, Kwanak-Gu; Jung-ik Ha, 108-401, Hyundai Apartment, 1694, Sillim-Dong, Kwanak-Gu, both of Seoul, Rep. of Korea

[21] Appl. No.: 921,658

[22] Filed: Aug. 28, 1997

[30] Foreign Application Priority Data

Aug. 5, 1997 [KR] Rep. of Korea ................. 1997/37412

[51] Int. Cl.$^6$ ........................................................ H02P 1/34
[52] U.S. Cl. ........................ 318/821; 318/490; 318/767; 364/571.01
[58] Field of Search .................................. 318/490, 767, 318/798–815, 821; 364/571.01

[56] References Cited

U.S. PATENT DOCUMENTS

| | | | |
|---|---|---|---|
| 3,629,518 | 12/1971 | Costa | 364/74 X |
| 4,884,023 | 11/1989 | Schmidt et al. | 318/490 X |
| 5,594,670 | 1/1997 | Yamamoto | 318/767 X |

OTHER PUBLICATIONS

T. Ohtani et al., "Vector Control of an Induction Motor Without Shaft Encoder," *IEEE Trans. Ind. Appl.*, vol. 28, No. 1, pp. 157–164 (1992).

M. Depenbrock, "Direct Self–Control(DSC) of Inverter–fed Induction Machine," *IEEE Trans. Power Electron.*, vol. 3, No. 4, pp. 420–429 (1988).

K.D. Hurst et al., "Zerospeed Tacho–less I.m. Torque Control: Simply a Matter of Stator Voltage Integration", *IEEE APEC Conf. Record*, pp. 749–753 (1997).

C. Schauder, "Adaptive Speed Identification For Vector Control of Induction Motors Without Rotational Transducers," *Conf. Rec. IEEE IAS Annual Meeting*, pp. 493–499 (1989).

H. Tajima et al., "Speed Sensorless Field Orientation Control of the Induction Machine," *Conf. Rec. IEEE—IAS Annual Meeting*, pp. 385–391 (1991).

Y. –R. Kim et al., "Speed Sensorless Vector of an Induction Motor Using an Extended Kalman Filer," *Conf. Rec IEEE IAS Annual Meeting*, pp. 594–599 (1992).

H. Kubota et al., "Speed Sensorless Field–Oriented Control of Induction Motor with Rotor Resistance Adaptation," *IEEE Trans. Ind. Appl.*, vol. 30, No. 5, pp. 1219–1224 (1994).

J. Holtz, "Speed Estimation and Sensorless Control of AC Drives," *Conf. Rec. IEEE IECON*, pp. 649, 650, 652–654 (1993).

M. Ishida et al., "A New Slip Frequency Detector of an Induction Motor Utilizing Rotor Slot Harmonics," *IEEE Trans. Ind. Appl.* vol. 20, No. 3, pp. 575–582 (1984).

K.D. Hurst et al., "Sensorless Speed Measurement Using Current Harmonics Spectral Estimation in Induction Machine Drives," *IEEE Trans. Power Electron.*, vol. 11, No. 1, pp. 66–73 (1996).

(List continued on next page.)

*Primary Examiner*—Karen Masih
*Attorney, Agent, or Firm*—Baker & Maxham

[57] ABSTRACT

The present invention is related to the method to find the rotor flux angle from stator voltages and currents by injecting high frequency signal. The injected signal is not rotating one but fluctuating one at a reference frame rotating synchronously to the fundamental stator frequency. The difference of impedances between the flux axis and the quadrature axis at high frequency signal injected on the rotor flux angle is explained by the equivalent circuit equation of the induction machine. The difference is verified by experiments on the test motors at various conditions. The sensorless field orientation control method is proposed and experimental results clarify the satisfactory operation of the method with 150% load torque at zero stator frequency.

10 Claims, 8 Drawing Sheets

OTHER PUBLICATIONS

A. Ferrah et al., "A Transputer–based Speed Identifier for Induction Motor Drives Using Real–time Adaptive Filter," *IEEE IAS Conf. Record,* pp. 394–400 (1996).

P.L. Jansen et al., Transducerless Field Orientation Concepts Employing Saturation–Induced Saliencies in Induction Machines, *Conf. Rec. IEEE IAS Annual Meeting,* pp. 174–181 (1995).

M. Schroedl, "Sensorless Control of AC Machines at Low Speed and Standstill Based on the 'Inform' Method," *Conf. Rec. IEEE IAS Annual Meeting,* pp. 270–277 (1996).

F. Blaschke et al., "Sensorless Direct Field Orientation at Zero Flux Frequency," *Conf. Rec. IEEE IAS Annual Meeting,* pp. 189–196 (1996).

S.I. Yong et al., "Sensorless Vector Control of Induction Machine Using High Frequency Current Injection," *Conf. Rec. IEEE IAS Annual Meeting,* pp. 503–508 (1994).

SENSORLESS FIELD ORIENTATION CONTROL METHOD OF AN INDUCTION MACHINE BY HIGH FREQUENCY SIGNAL INJECTION

BACKGROUND OF THE INVENTION

The sensorless drive of an induction machine has been studied for last two decades. And some of the results are applied to industrial fields (Reference 1,2). But the performance of the drive is still much inferior to that of the sensored drive. Especially, at low or zero stator frequency the torque control ability of the drive is still far from the satisfaction. At higher stator frequency, practically higher than 10% of rated frequency, simple direct vector control method based on the integration of the stator terminal voltages gives satisfactory torque control performance (Reference 3). Most of the sensorless drive algorithms are based on the assumption of d-q equivalent circuit of the induction machine (Reference 4-7), and hence they are dependent on the machine parameters and measurement errors. At low stator frequency region, signal to noise ratio of the stator voltage measurement is very poor and stator resistance voltage drop is dominant. At zero stator frequency, even theoretically no rotor dynamics can be measured at the stator terminals (Reference 8). With these reasons the sensorless algorithm based on d-q circuit fail at low and zero stator frequency region no matter how algorithm is superior. Another group of sensorless algorithms is using non ideal phenomenon of the machine characteristics such as eccentricity of rotor, rotor slot harmonics, and rotor unbalance (Reference 9,10). These algorithms need. frequency spectrum analysis, and they are time consuming and need some machine construction data such as number of rotor and stator slot, which can not be easily obtained from off the shelf. Even with newly developed FFT algorithm, still the performance of the speed control bandwidth of the drive looks like unsatisfactory (Reference 11). Third category of the algorithm is injecting some signals to the motor and checking the response of the motor to the injected signals (Reference 12~15). Most of these algorithms depend on the variation of rotor leakage inductance according to the intensity of the main flux. This algorithm gives reasonably satisfactory performance for the open rotor slot motor. But in the case of closed rotor slot, unfortunately most of small and medium power squirrel cage induction machine is the case, the algorithm does not work well especially at loaded operating condition because of similar saturation effect on the leakage inductance with load current flowing in rotor circuit. The torque controllability at low and zero frequency region could be a great asset to off-the-shelf general purpose inverter feeding conventional squirrel cage induction motor. So far, most algorithms do not work well with mass produced closed rotor clot motor in zero or low stator frequency region under heavily loaded condition.

SUMMARY OF THE INVENTION

In the present invention, a new method based on harmonic signal injection to the motor is proposed. The method can be implemented on the existing digitally controlled inverter by only amending software of the inverter without any extra hardware. In the method according to the present invention, a flux axis is determined using the characteristic that the impedance on the flux axis differs from that on the quadrature axis to the flux axis for high frequency fluctuating signal in the synchronously rotating reference frame. Normally the difference is not measurable at fundamental frequency but is measurable at injected high frequency due to the skin effect. According to the present invention, after signal processing with injected high frequency fluctuating signal, field orientation control is achieved with the difference of the impedance.

The method gives reasonable torque control capability at zero and low stator frequency even under heavily loaded condition. Being compared to other signal injection method (Reference 12), it injects not rotating signal but fluctuating signal on the flux axis, and hence it generate no torque ripple, no vibration and less audible noise. Its signal processing is quite simple compared to the method which needs Kalman filter approach (Reference 13).

DETAILED DESCRIPTION OF THE INVENTION

Figure 1:
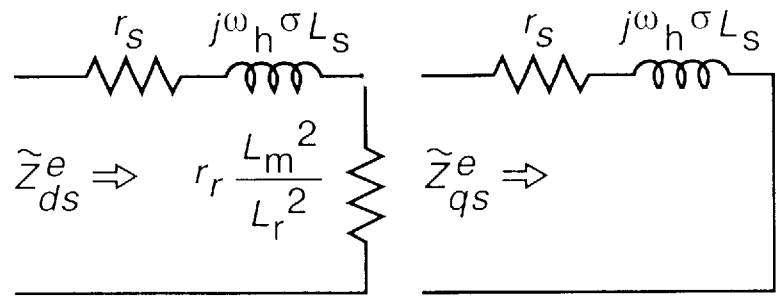
FIG. 1 shows a d-q equivalent circuits for the high frequency in the synchronously rotating reference frame.

The rotating high frequency stator currents are governed predominantly by the stator and rotor leakage inductance. Therefore, if there is no spatial modulation in the rotor leakage inductance, no information about rotor position or flux angle can be detectable. But zero or low speed, the effect on the fluctuating signals in the synchronously rotating reference frame differ from the effect on the rotating ones. Thus, it is possible to detect the information about rotor flux angle without any spatial modulation.

The well-known voltage equations for induction machine are expressed as following equations (1), (2), (3) and (4).

The following equations (1) are stator voltage equations.

$$V_{ds}^e = r_s i_{ds}^e + \frac{d\lambda_{ds}^e}{dt} - \omega_e \lambda_{qs}^e, \quad (1)$$

$$V_{qs}^e = r_s i_{qs}^e + \frac{d\lambda_{qs}^e}{dt} - \omega_e \lambda_{ds}^e$$

In the above equations (1), $V_{ds}^e$, $V_{qs}^e$ are respectively, d axis, q axis stator voltage(in synchronous reference frame), $i_{ds}^e$, $i_{qs}^e$ are respectively, d axis, q axis stator current(in synchronous reference frame), $\lambda_{ds}^e$, $\lambda_{qs}^e$ are respectively, d axis, q axis stator flux(in synchronous reference frame), $r_s$ is stator resistance, $\omega_e$ is synchronous rotational angle velocity.

The following equations (2) are rotor voltage equations.

$$0 = r_r i_{dr}^e + \frac{d\lambda_{dr}^e}{dt} - (\omega_e - \omega_r)\lambda_{qr}^e, \quad (2)$$

$$0 = r_r i_{qr}^e + \frac{d\lambda_{qr}^e}{dt} + (\omega_e - \omega_r)\lambda_{dr}^e$$

In the above equations (2), $i_{dr}^e$, $i_{qr}^e$ are respectively, d axis, q axis rotor current(in synchronous reference frame), $\lambda_{dr}^e$, $\lambda_{qr}^e$ are respectively d axis, q axis rotor flux(in synchronous reference frame), $r_r$ is rotor resistance, $\omega_r$ is rotor electric angle velocity.

The following equations (3) and (4) are flux linkage equations.

$$\lambda_{ds}^e = L_s i_{ds}^e + L_m i_{dr}^e,$$

$$\lambda_{qs}^e = L_s i_{qs}^e + L_m i_{qr}^e \quad (3)$$

$$\lambda_{dr}^e = L_m i_{ds}^e + L_r i_{de}^e,$$

$$\lambda_{qr}^e = L_m i_{qs}^e + L_r i_{dr}^e \quad (4)$$

In the above equations (3) and (4), $L_s$ is rotor leakage inductance, $L_m$ is induction machine magnetization inductance, $L_r$ is rotor inductance.

By assuming the rotor flux oriented control, that is $\lambda_{qr}^e=0$, $i_{qs}^e$ and $i_{ds}^e$ are rewritten as the following equation (5).

$$i_{qs}^e = -\frac{L_r}{L_m} i_{qr}^e \quad (5)$$

$$i_{ds}^e = -\frac{r_r + pL_r}{pL_m} i_{dr}^e$$

In the above equation (5), p is a differential operator. Then, we can obtain the following equation (6) for $V_{ds}^e$ from the above equations (1), (3), (4) and (5).

$$V_{ds}^e = \left( r_s + p\sigma L_s + p\frac{r_r L_m^2}{L_r(r_r + pL_r)} \right) i_{ds}^e - \omega_e \lambda_{qs}^e \quad (6)$$

$$V_{qs}^e = (r_r + p\sigma L_s) i_{qs}^e + \omega_e \lambda_{ds}^e$$

At zero or low stator frequency, where the magnitude of $\omega_e$ is quite small(that is, at zero or low speed), if the high frequency fluctuating signals are injected, $\omega_e \lambda_{qs}^e (<<V_{ds}^e)$ and $\omega_e \lambda (<<V_{ds}^e (<<V_{qs}^e)$ terms in the above equation (6) is neglected. So, the above equation (6) can be rewritten as the following equation (7).

$$V_{ds}^e \approx \left( r_s + p\sigma L_s + p\frac{r_r L_m^2}{L_r(r_r + pL_r)} \right) i_{ds}^e \quad (7)$$

$$V_{qs}^e \approx (r_r + p\sigma L_s) i_{qs}^e$$

Especially, for high frequency component, the above equation (7) can be rewritten as the following equation (8).

$$\tilde{V}_{ds}^e \approx \left( r_s + j\omega_h \sigma L_s + j\omega_h \frac{r_r L_m^2}{L_r(r_r + j\omega_h L_r)} \right) \tilde{i}_{ds}^e \quad (8)$$

$$\tilde{V}_{qs}^e \approx (r_r + j\omega_h \sigma L_s) \tilde{i}_{qs}^e$$

where, $V_{ds}^e$ is, $V_{ds}^e = V_{dsl}^e + \tilde{V}_{dsh}^e = V_{dsl}^e + V_{dsh}^e \sin(\omega_h t)$, $V_{qs}^e$ is, $V_{qs}^e = V_{qsl}^e + \tilde{V}_{qsl}^e + V_{qsh}^e \sin(\omega_h t + \phi)$. In the above equation (8), "~" means the high frequency component in the steady state.

Generally, because the rotor resistor, $r_r$ is much smaller than $\omega_h L_r$, it can be assumed that $r_r + j\omega_h L_r$. Then the above equation (8) is expressed as the following equation (9). The d-q equivalent circuits for the high frequency can be shown in FIG. 1.

$$\tilde{V}_{ds}^e \approx \left( r_s + r_r \frac{L_m^2}{L_r^2} + j\omega_h \sigma L_s \right) \tilde{i}_{ds}^e = \tilde{Z}_d \tilde{i}_{ds}^e \quad (9)$$

$$\tilde{V}_{qs}^e \approx (r_s + j\omega_h \sigma L_s) \tilde{i}_{qs}^e = \tilde{Z}_q \tilde{i}_{qs}^e$$

Due to the skin effect at high frequency, the value of rotor resistor, $r_r$ is dozen of times as large as that at fundamental frequency, and the value of $\sigma L_s$ also becomes much smaller at high frequency than that at fundamental frequency. Thus, because the contribution of rotor resistance term to the terminal impedance($Z_d$) is increased in relative to the reactance term, it is apparent that the difference between the d and q-axis terminal impedance is detectable.

Hence, for the fluctuating signals in the synchronously rotating reference frame, the impedance on the rotor flux axis differs from that on the quadrature axis to the rotor flux as shown in the following equation (10).

$$\tilde{Z}_d > \tilde{Z}_q \quad (10)$$

The fluctuating signals result in eddy current loss, the additional copper loss, hysteresis loss, stray loss and so on. So, the level of injected signal should be kept as small as possible.

A position of a flux axis in the synchronously rotating reference frame is determined on the basis of the above described difference between the impedance on the rotor flux axis and that on the quadrature axis to the rotor flux in the present invention.

Figure 2:
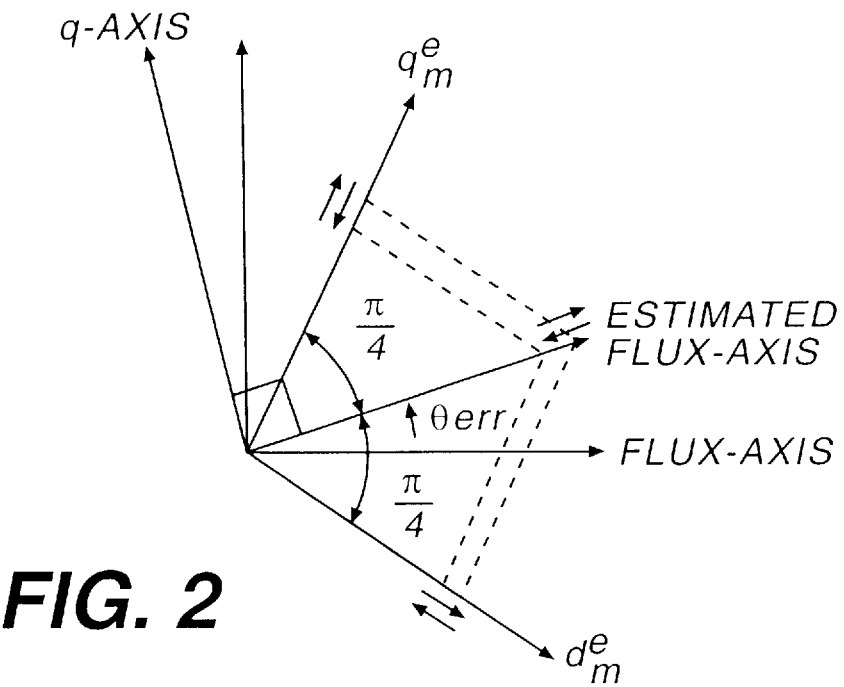
FIG. 2 shows an estimated flux axis, two orthogonal measurement axes and flux axis in the synchronously rotating reference frame.

For tracking of flux angle to determine the position of flux axis, the high frequency fluctuating signal on the estimated flux axis in the synchronous reference frame is used. At starting, an arbitrary axis is assumed as the estimated flux axis. The effect of the signal can be measured on two orthogonal measurement axes. FIG. 2 shows an estimated flux axis, two orthogonal measurement axes and flux axis in the synchronously rotating reference frame. Two orthogonal measurement axes consists of the first measurement axis, $d_m^e$ which lags the estimated flux axis by $\pi/4$ and the second measurement axis, $q_m^e$ which leads the estimated flux axis by $\pi/4$.

As the impedance on the flux axis and that on the quadrature axis to the flux axis differs, the impedance on the estimated flux axis which is positioned between two axes changes depending on the error angle($\theta_{err}$) between the estimated flux axis and the flux axis. Also, as shown in the above equation (10), because the impedance on the flux axis is greater than the impedance on the quadrature axis to the flux axis, the impedance measured on the estimated axis is maximum when the error angle (θerr) is minimum. Hence, the position of the estimated flux axis on which measured impedance is maximum can be determined as the flux axis.

In order to find the position of the estimated flux axis on which measured impedance is maximum, we use two orthogonal measurement axes, $d_m^e$ and $q_m^e$ as shown in FIG. 2 in the preferred embodiment of the invention. Because $d_m^e$ and $q_m^e$ are parted from the estimated flux axis by equal angle($\pi/4$), impedance on the estimated flux axis is maximum at the time impedances measured on each measurement axe is equal. Hence, the strategy of the invention is to find the position of the estimated flux axis of which two orthogonal measurement axes give equal impedance.

If the estimated flux axis is between the real flux axis and quadrature axis to the real flux axis, then the measured high frequency components on the $d_m^e$ and $q_m^e$-axis would be different.

To measure the impedance on two orthogonal measurement axes, the high frequency fluctuating signal is injected. In the implementation of injecting signals, there are the voltage injection type and the current injection type.

Figure 3:
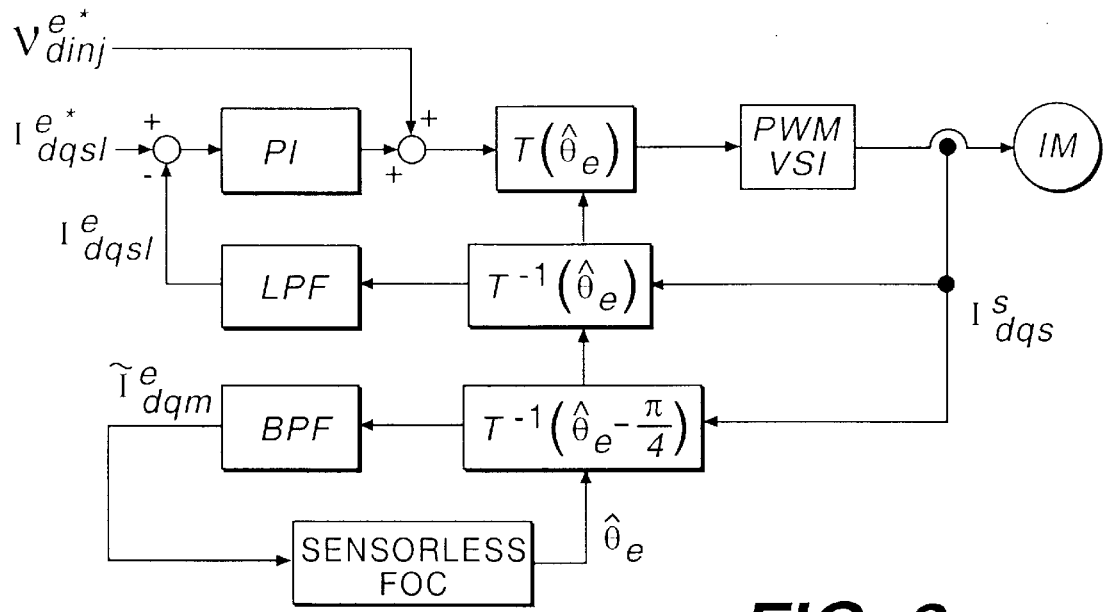
FIG. 3 is a proposed block diagram of control method of the high frequency voltage injection type according to the present invention
Figure 4:
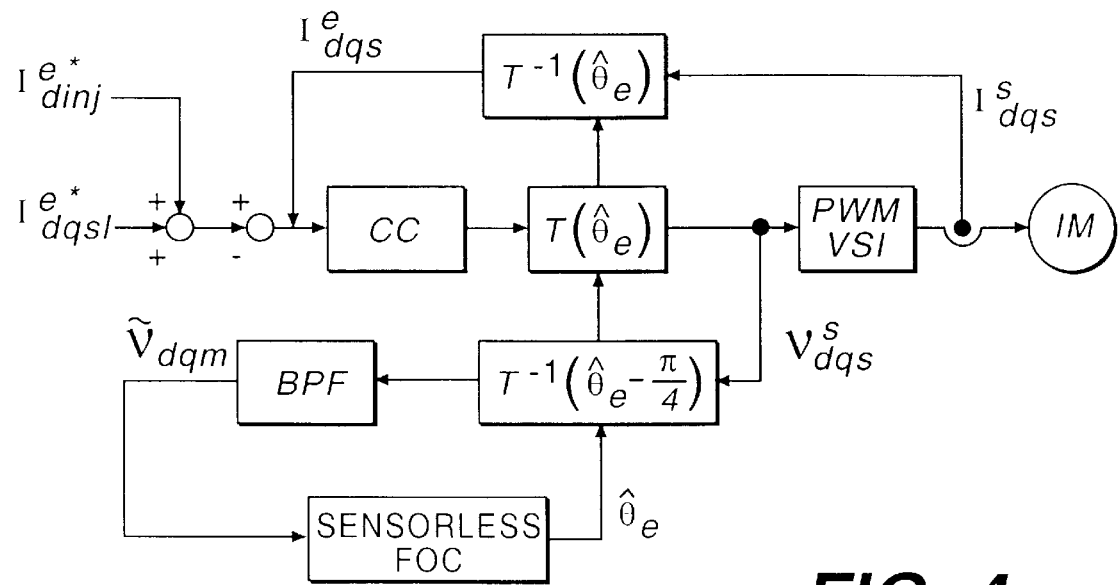
FIG. 4 is a proposed block diagram of control method of the high frequency current injection type according to the present invention.
Figure 6:
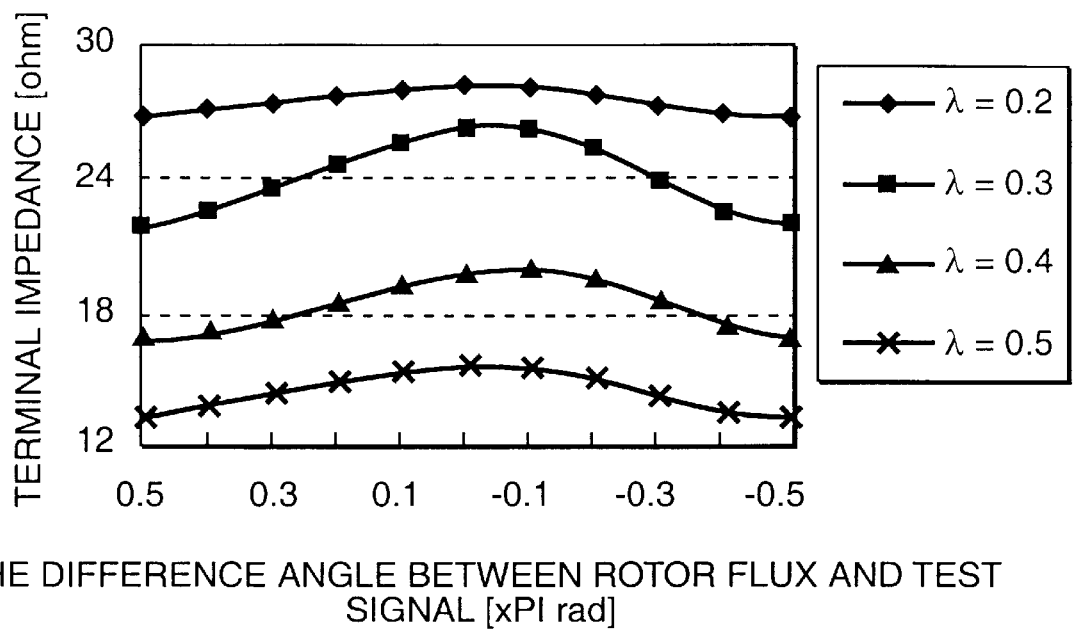
FIG. 6 shows variation of impeadance depending on the difference angle between rotor flux axis and an estimated flux axis at various flux in 5 hp induction machine.

FIG. 3 is a proposed block diagram of control method of the high frequency voltage injection type according to the present invention, and FIG. 4 is a proposed block diagram of control method of the high frequency current injection type according to the present invention.

The injecting signal in the former is added to the estimated flux component of the controller output as shown in FIG. 3. In this method, for the purpose of avoiding the cancellation of the injected signal by the current controller, the bandwidth of current controller should be let down and filtered signals should be used in the feedback control. In the latter, the injecting signal is added to the fundamental current reference on the estimated flux axis as shown in FIG. 4. In order to inject high frequency current correctly, the current controller should have sufficient bandwidth. The former(the voltage injection type) has the inherent limitation of current control and speed control bandwidth, but the signals are less vulnerable to nonlinear effect such as dead time effect. The latter(the current injection type) has possibility of higher bandwidth of speed control but it requires more elegant signal processing against the non-linear effects of the system.

Figure 5:
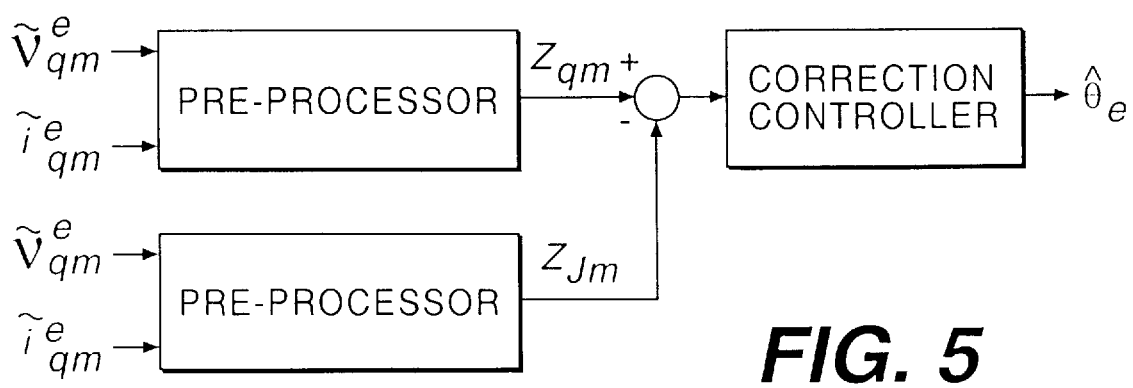
FIG. 5 is a proposed block diagram of the sensorless FOC in the FIG. 3 and FIG. 4.

FIG. 5 is a proposed block diagram of the sensorless FOC in the FIG. 3 and FIG. 4. The signals measured on the $d_m^e$ and $q_m^e$-axis is used in tracking of the rotor flux angle as shown in FIG. 5. In the pre-process, the information correlated to the impedance at the injected high frequency is calculated on the $d_m^e$ and $q_m^e$-axis. In the correction controller, using these impedances obtained in the pre-process, the tracking of the flux angle is carried out.

In the high frequency voltage injection method, if the injected voltage is fixed, the terminal impedances on the measurement axes depend on the measured currents. The difference between the squared of the magnitude of $\tilde{i}^e_{dm}$ and that of the magnitude of $\tilde{i}^e_{qm}$ is proportional to the difference of the admittances measured on the each axis. In high frequency current injection method, there are similar relations. Therefore, the schemes on FIG. 3 and FIG. 4 are plausible in each case.

Relations between terminal voltages and currents on the measurement axes $d_m^e$, $q_m^e$ are expressed as the following equation (11)

$$\tilde{v}^e_{dm} \approx \left( r_r + \frac{r_r L_m^2}{2L_r^2} \left[ 1 + \cos\left(2\theta_{err} - \frac{\pi}{2}\right) \right] + j\omega_h \sigma L_s \right) \tilde{i}^e_{dm} \quad (11)$$

$$\tilde{v}^e_{qm} \approx \left( r_r + \frac{r_r L_m^2}{2L_r^2} \left[ 1 + \cos\left(2\theta_{err} - \frac{\pi}{2}\right) \right] + j\omega_h \sigma L_s \right) \tilde{i}^e_{qm}$$

where, $\theta_{err} = \hat{\theta}_e - \theta_e$, $\theta_e$ is actual rotor flux angle, $\hat{\theta}_e$ is the estimated rotor flux angle.

High Frequency Voltage Injection

If the injected high frequency voltage is as following equation (12), the error of measured signals is as following equation (13), $$\tilde{v}^e_{dm} = \tilde{v}^e_{qm} = \frac{V^*_{inj}}{\sqrt{2}} \sin(\omega_h t) \quad (12)$$

$$Err = |\tilde{i}^e_{dm}|^2 - |\tilde{i}^e_{qm}|^2 = \quad (13)$$

$$\frac{V^{*2}_{inj} r_r \frac{L_m^2}{L_r^2} \left( r_s + r_r \frac{L_m^2}{2L_r^2} \right) \sin 2\theta_{err}}{\left| \left( r_s + j\omega_h \sigma L_s + r_r \frac{L_m^2}{L_r^2} \right) (r_s + j\omega_h \sigma L_s) \right|^2} =$$

$$\frac{V^{*2}_{inj} r_r \frac{L_m^2}{L_r^2} \left( 2r_s + r_r \frac{L_m^2}{L_r^2} \right)}{\left| \left( r_s + j\omega_h \sigma L_s + r_r \frac{L_m^2}{L_r^2} \right) (r_s + j\omega_h \sigma L_s) \right|^2} (\theta_e - \hat{\theta}_e) \equiv Y_{err}(\theta_e - \hat{\theta}_e)$$

As shown in the above equation (13), angle error is proportional to the difference between the squares of the current amplitude on each measurement axis. Hence, Determining a flux axis is effected by finding the estimated flux axis which has minimum difference between the squares of the current amplitude on each measurement axis in the voltage injection type.

If the controller is $$G(s) = \frac{1}{s}\left( K_P + \frac{K_I}{s} \right),$$

the estimated flux angle and the real flux angle have frequency response as following equation (14).

$$\frac{\hat{\theta}_e(s)}{\theta_e(s)} = \frac{K_1 s + K_2}{s^2 + K_1 s + K_2} \quad (14)$$

where, $K_1 = Y_{err} K_p$, $K_2 = Y_{err} K_I$.

High Frequency Current Injection

If the injected high frequency current is as following equation (15), the error of measured signals is as following equation (16).

$$\tilde{i}^e_{dm} = \tilde{i}^e_{qm} = \frac{I^*_{inj}}{\sqrt{2}} \sin(\omega_h t) \quad (15)$$

$$Err = |\tilde{v}^e_{dm}|^2 - |\tilde{v}^e_{qm}|^2 = \quad (16)$$

-continued $$-I^{*2}_{inj}r_r \frac{L_m^2}{2L_r^2} \left(2r_s + r_r \frac{L_m^2}{2L_r^2}\right) \sin 2\theta_{err} =$$

$$I^{*2}_{inj}r_r \frac{L_m^2}{L_r^2} \left(2r_s + r_r \frac{L_m^2}{L_r^2}\right) (\theta_e - \hat{\theta}_e) \equiv Z_{err}(\theta_e - \hat{\theta}_e)$$

As shown in the above equation (16), angle error is proportional to the difference between the squares of voltage amplitude on each measurement axis. Hence, Determining a flux axes is effected by finding the estimated flux axis which has minimum difference between the squares of voltage amplitude on each measurement axis in the current injection type.

If the controller is $$G(s) = \frac{1}{s}\left(K_p + \frac{K_I}{s}\right),$$

the estimated flux angle and the real flux angle have frequency response as following equation (17).

$$\frac{\hat{\theta}_e(s)}{\theta_e(s)} = \frac{K_1 s + K_2}{s^2 + K_1 s + K_2} \qquad (17)$$

where, $K_1 = Z_{err}K_p$, $K_2 = Z_{err}K_I$.

The error is in the form of a linear angle error such as the above equations (13) and (16). These errors can be driven away using the scheme as shown in FIG. 3 or FIG. 4.

The experimental example results of the present invention will now be described in the following examples.

EXAMPLE 1

Measurement of High Frequency Impedance Difference

At the high frequency region the difference of terminal impedance in the excited induction machine is examined in a test motor and shown in FIG. 6, 9, 10, and 11. The 5 hp general-purpose induction machine is used in the experiments and its characteristics are listed in the following table 1.

TABLE 1

The Characteristics of the Test Induction Machine

| | |
|---|---|
| Rated Power | 5 hp |
| Rated Voltage | 220/440 V |
| Number of Phase | 3 |
| Number of Pole | 4 |
| Rated Frequency | 60 Hz |
| Rated Speed | 1730 rpm |
| Frame | 112 M |
| Type of Rotor and Rotor Slot | squirrel cage closed slot |

Figure 7:
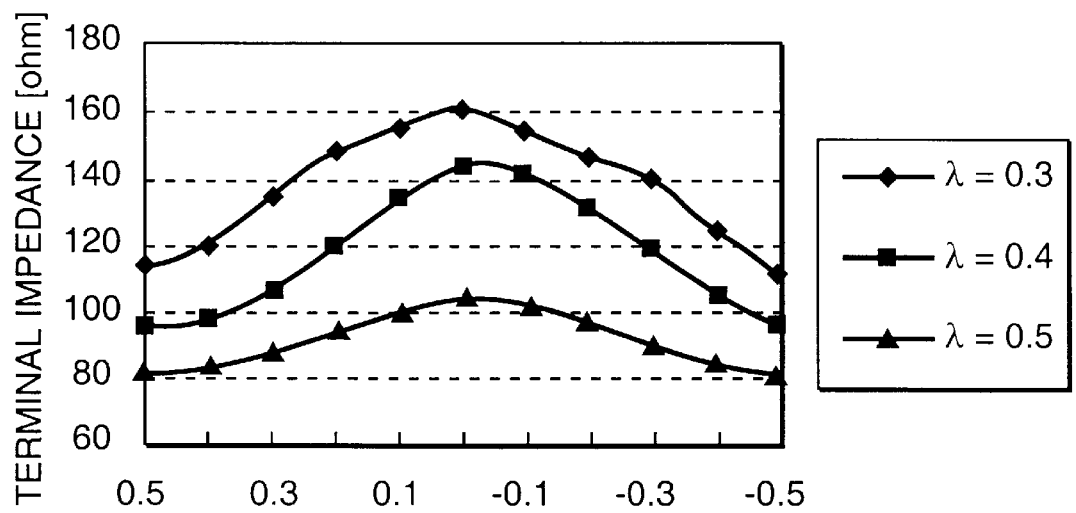
FIG. 7 shows variation of impeadance depending on the difference angle between rotor flux axis and an estimated flux axis at various flux in 1 hp induction machine.
Figure 8:
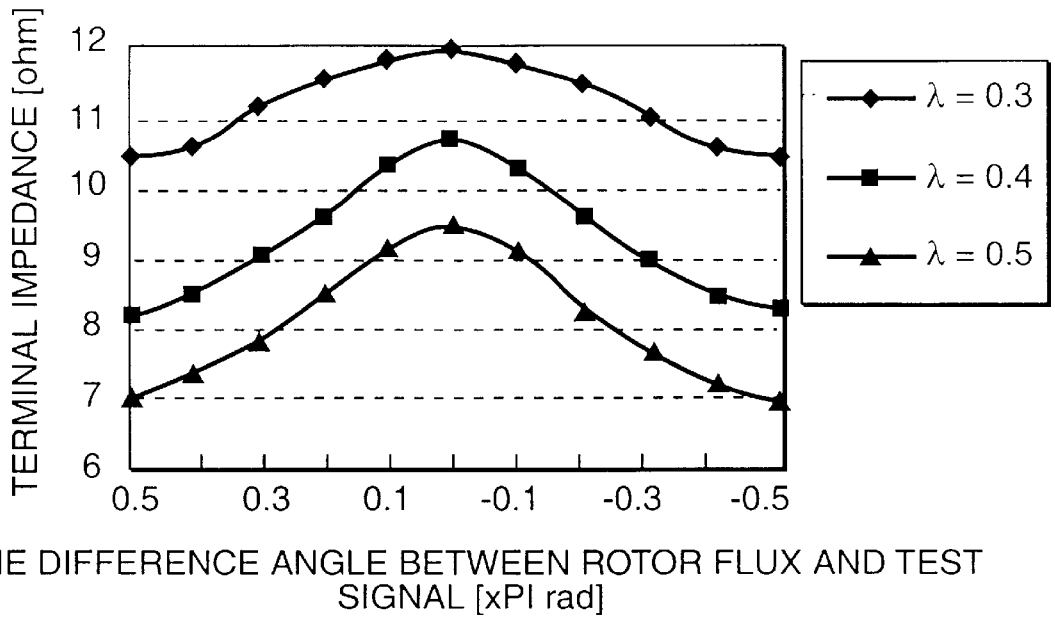
FIG. 8 shows variation of impedance depending on the difference angle between rotor flux axis and an estimated flux axis at various flux in 10 hp induction machine.
Figure 9:
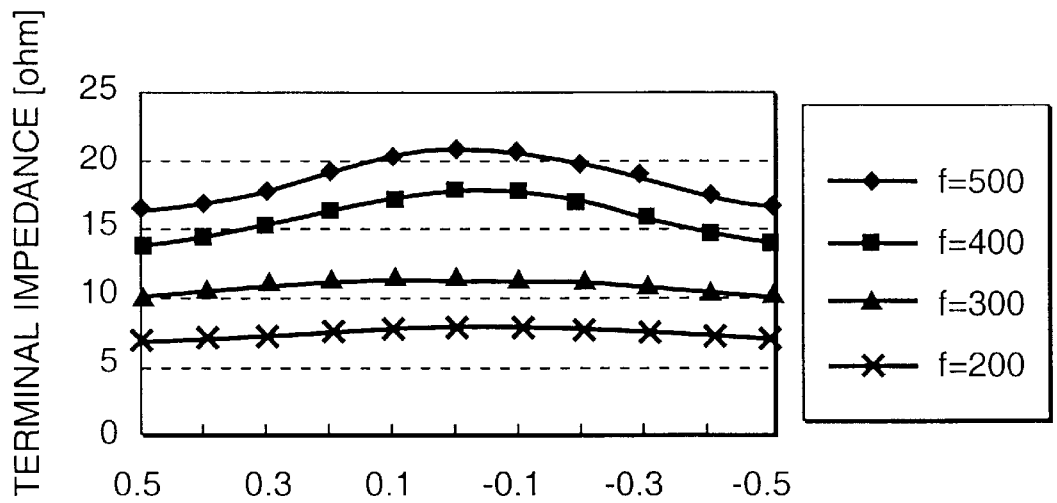
FIG. 9 shows variation of impedance depending on the difference angle between rotor flux axis and an estimated flux axis at various frequency in 5 hp induction machine.

The impedance on the rotor flux axis is higher than that on any other axis as described above. The similar aspects are appeared in the different power rating general-purpose induction machines. FIG. 7 and FIG. 8 are test results for 1 hp and 10 hp induction machines with the closed rotor slots, respectively.

Figure 10:
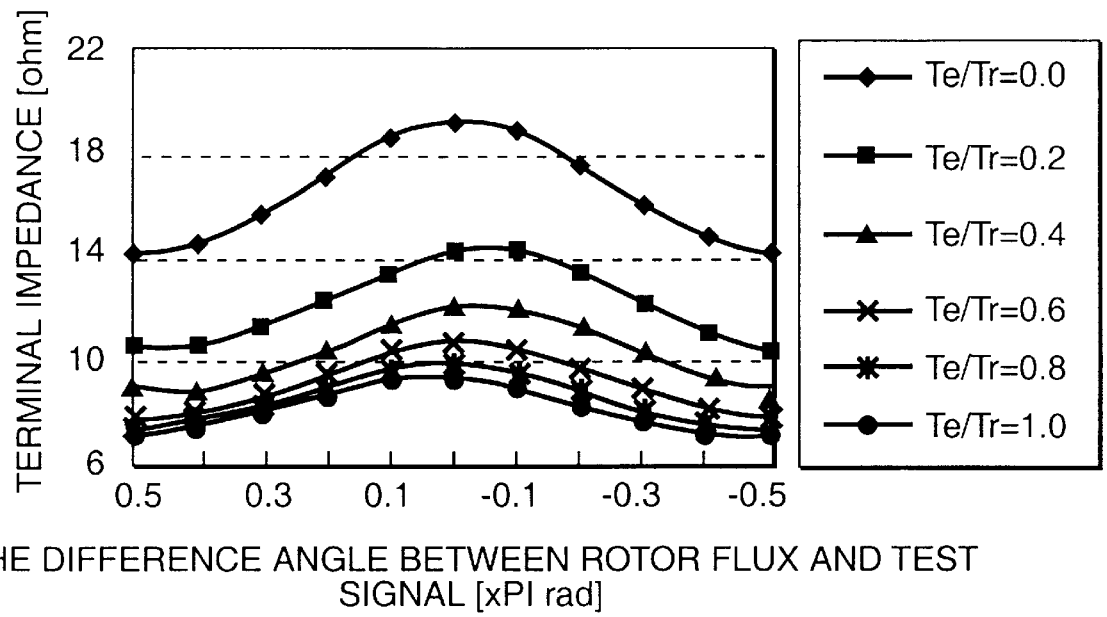
FIG. 10 shows variation of impedance depending on the difference angle between rotor flux axis and an estimated flux axis under various load torque in 5 hp induction machine.
Figure 11:
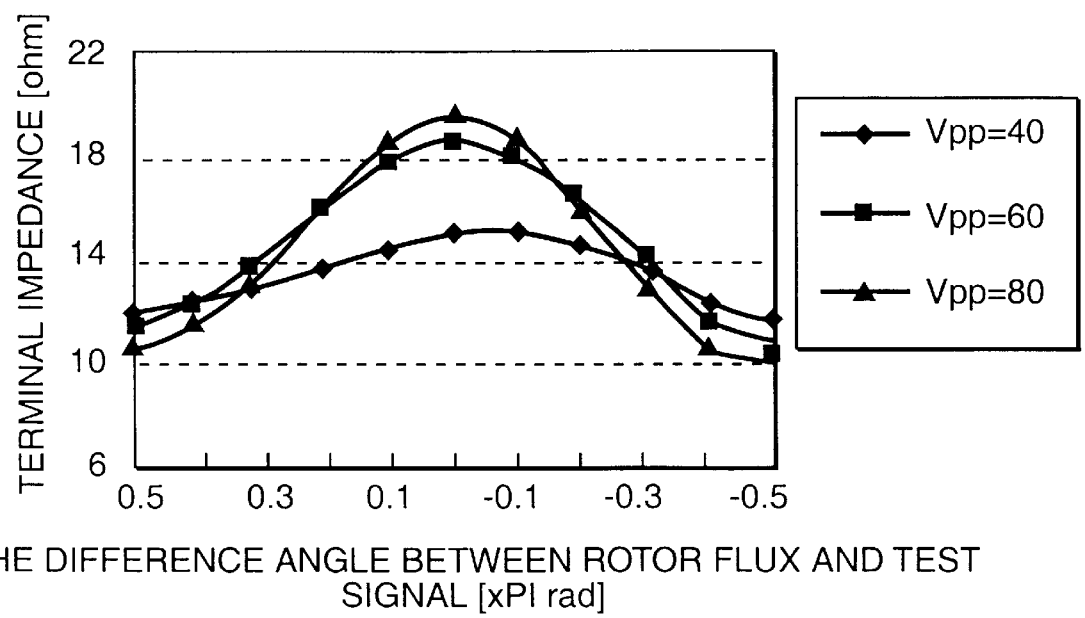
FIG. 11 shows variation of impedance depending on the difference angle between rotor flux axis and an estimated flux axis at various injected voltages in 5 hp induction machine.

The spatial difference of the terminal impedances in various conditions with 5 hp machine is measured. They are measured using the fluctuating signals in the synchronous reference frame. The higher frequency of injected signal makes much difference of impedances. This examined in FIG. 9. They also show the spatial difference of the terminal impedance under various load as shown in FIG. 10. These experiments are performed under locked rotor. The high-level injected signal makes much differences as shown in FIG. 11. In these various cases, the characteristics that the impedance on the rotor flux axis is higher than that on any other axis is measured.

EXAMPLE 2

Field Orientation Control

Figure 12:
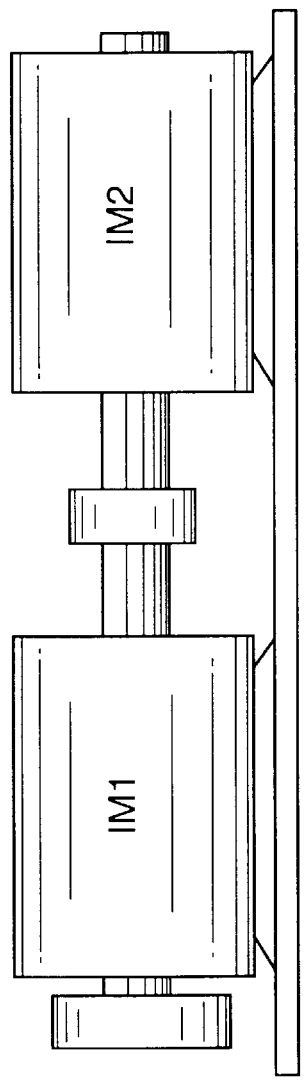
FIG. 12 shows a system configuration for the experiments of sensorless field orientation control method according to the present invention.

FIG. 12 shows a system configuration for the experiments of the proposed sensorless field orientation control method according to the present invention. For the experiments at zero and low stator frequency, the induction machine 1 is running in the speed control mode with sensored field orientation control and the induction machine 2, which is under test, is in the torque control mode with the proposed sensorless control. Digitally controlled voltage-fed PWM IGBT inverters are used for this experiment and its main processor is TMS320C31.

Figure 13:
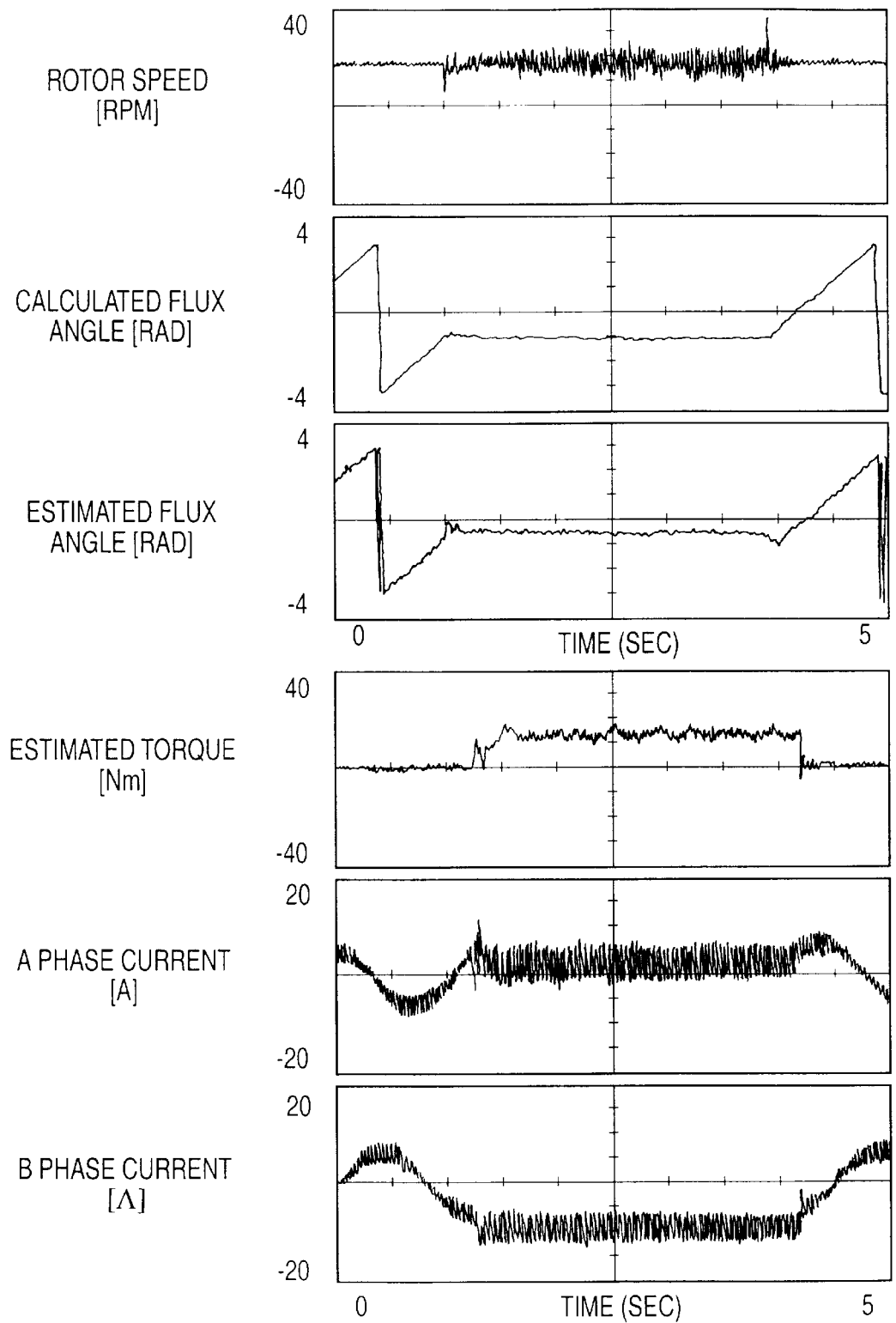
FIG. 13 shows step torque response of the method according to the present invention under 75% step load.
Figure 14:
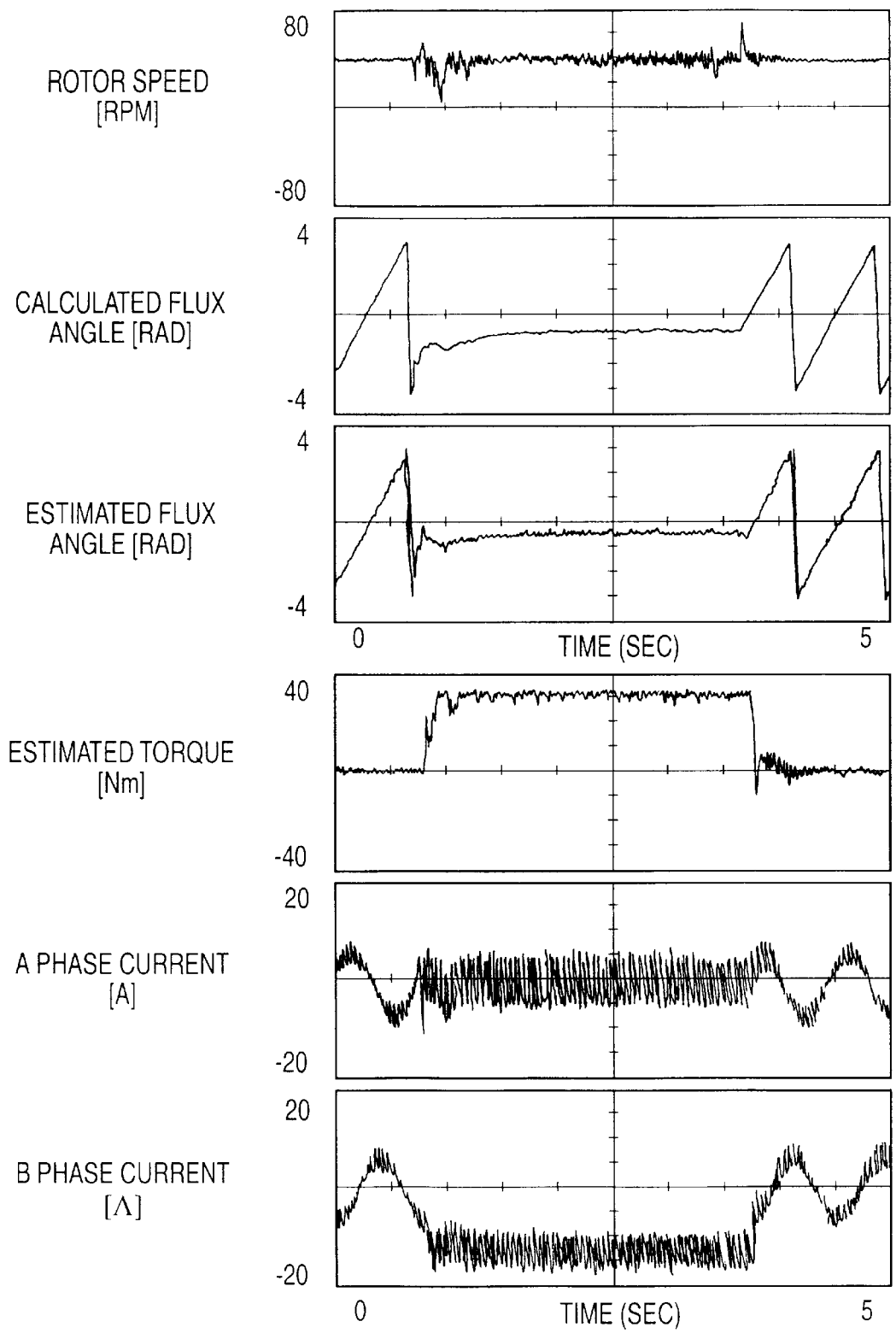
FIG. 14. shows a step torque response of the method according to the present invention under 150% step load.

The experimental results under 75% and 150% step load, respectively are shown in FIG. 13 and FIG. 14. The measured rotor speed, the flux angle calculated using rotor speed and stator current, the estimated rotor flux position, the estimated torque and phase currents are illustrated in each figure. In the experiments, the torque is estimated in motor 1. Hence, the generated torque by the motor 2 has reverse sign of the estimated torque. When the system is under the load, the stator frequency of the motor 2 is zero.

At no load condition, the flux angle coincides with current angle. Therefore, the injected signals appear near the peak of phase current. But, under load condition, the torque current is higher than the flux current. In this case, the higher injected signals appear near the lower level of phase current shown in FIG. 13 and FIG. 14. From the FIG. 13, it can be seen that the speed of the machines is maintained 20 rpm regardless of load torque variation due to the speed control of motor 1 and that the torque of motor, which is under test, is following its command. The stator frequency of the motor 2 is changing from ⅔ Hz to 0 Hz and back to ⅔ Hz according to the torque. In FIG. 14, the same test is done with 150% rated load torque command. The trace of FIG. 13 and FIG. 14 shows clearly that the motor 2 is under torque servo mode even at zero stator frequency.

REFERENCE

[1] T. Ohtani, N. Takada and K. Tanaka, "Vector control of an induction motor without shaft encoder" IEEE Trans. Ind. Appl., Vol. IA-28, No.1, pp. 157–164, 1992.

[2] M. Depenbrock, "Direct self-control(DSC) of inverter-fed induction machine," IEEE Trans. Power Electron., Vol 3, No. 4, October, 1988.

[3] K. D. Hurst, T. G. Habetler, G. Griva and F. Profumo, "Zerospeed tacho-less I. M. torque control: simply a matter of stator voltage integration," IEEE APEC Conf. Record, 1997, pp749–753.

[4] Colin Schauder, "Adaptive Speed Identification For Vector Control of Induction Motors Without Rotational Transducers," Conf. Rec. IEEE IAS Annual Meeting, pp.493–499, 1989

[5] Tajima, Y. Hori, "Speed Sensorless Field Orientation Control of the Induction Machine," Conf. Rec. IEEE-IAS Annual Meeting, pp.385–391, 1991

[6] R. Kim, S. K. Sul and M. H. Park, "Speed Sensorless Vector Control of an Induction Motor using an Extended Kalman Filter," Conf. Rec IEEE IAS Annual Meeting, pp.594–599, 1992

[7] H. Kubota and K. Matsuse, "Speed sensorless field oriented control of induction machines," IEEE Trans. Ind. Appl., Vol. IA-30, No.5, pp. 1219–1224, 1994.

[8] J. Holtz, "Speed Estimation and Sensorless Control of AC Machine," Conf. Rec. IEEE IECON, pp.649–661, 1993

[9] M. Ishida and K. Iwata, "a new slip frequency detector of an induction motor utilizing motor slot harmonics," IEEE Trans. Ind. Appl. Vol. IA-20, No. 3, pp. 575–582, 1984.

[10] K. D. Hurst and T. G. Habetler, "Sensorless speed measurement using current harmonics spectral estimation in induction machine drives," IEEE Trans. Power Electron., Vol. 11, No. 1, Jan., 1996, pp. 66–73.

[11] A. Ferrah, K. J. Bradley, P. J. Hogben, M. S. Woolfson and G. M. Asher, "A transputer-based speed identifier for induction motor drives using real-time adaptive filtering," IEEE IAS Conf. Record, 1997, pp394–400.

[12] P. L. Jansen and R. D. Lorenz, "Transducerless Field Orientation Concepts Employing Saturation-Induced Saliencies in Induction Machines," Conf. Rec. IEEE IAS Annual Meeting, pp.174–181, 1995

[13] M. Schroedl, "Sensorless Control of AC Machines at Low Speed and Standstill Based on the 'INFORM' Method," Conf. Rec. IEEE IAS Annual Meeting, pp.270–277, 1996

[14] F. Blaschke, T. van der Burgt and A. Vandenput, "Sensorless Direct Field Orientation at Zero Flux Frequency," Conf. Rec. IEEE IAS Annual Meeting, pp.189–196, 1996

[15] S. I. Yong, J. W. Choi and S. K. Sul, "Sensorless Vector Control of Induction Machine Using High Frequency Current Injection," Conf. Rec. IEEE IAS Annual Meeting, pp.503–508, 1994

What is claimed is:

1. A method for field orientation control of an induction machine, comprising:

(a) assuming arbitrary axis as an estimated flux axis in the synchronously rotating reference frame;

(b) injecting a high frequency fluctuating signal to the estimated flux axis; and (c) determining the position of a flux axis by means of impedance on the estimated flux axis.

2. The method of claim 1, wherein the step of determining the position of a real flux axis comprises:

(a) dividing the high frequency fluctuating signal injected on the estimated flux axis into components on two orthogonal measurement axes; and (b) determining a real flux axis using the impedances on the two orthogonal measurement axes.

3. The method of claim 2, wherein in the step of dividing the high frequency fluctuating signal and in the step of determining the real flux axis, the two orthogonal measurement axes consist of a measurement axis which lags the estimated flux axis by $\pi/4$ and a measurement axis which leads the estimated flux axis by $\pi/4$.

4. The method of claim 2, wherein the step of determining the position of the real flux axis is effected by finding the position of the estimated flux axis where the two orthogonal measurement axes give equal impedance.

5. The method of claim 1, wherein in the step of injecting the high frequency fluctuating signal, a high frequency fluctuating voltage signal is injected to the estimated flux axis.

6. The method of claim 1, wherein if in the step of injecting the high frequency fluctuating signal, a high frequency fluctuating voltage signal is injected to the estimated flux axis, the step of determining the position of a real flux axis uses current signals on two orthogonal measurement axes which consist of a measurement axis which lags the estimated flux axis by $\pi/4$ and a measurement axis which leads the estimated flux axis by $\pi/4$.

7. The method of claim 6, wherein the step of determining the position of the real flux axis is effected by finding the estimated flux axis which has a minimum difference between squares of current amplitude on the two orthogonal measurement axes.

8. The method of claim 1, wherein in the step of injecting the high frequency fluctuating signal, a high frequency fluctuating current signal is injected to the estimated flux axis.

9. The method of claim 1, wherein if in the step of injecting the high frequency fluctuating signal, a high frequency fluctuating current signal is injected to the estimated flux axis, the step of determining the position of a real flux axis uses voltage signals on two orthogonal measurement axes which consist of a measurement axis which lags the estimated flux axis by $\pi/4$ and a measurement axis which leads estimated flux axis by $\pi/4$.

10. The method of claim 9, wherein the step of determining the position of the real flux axis is effected by finding the estimated flux axis which has a minimum difference between squares of voltage amplitude on the two orthogonal measurement axes.

* * * * *